Figure 1:
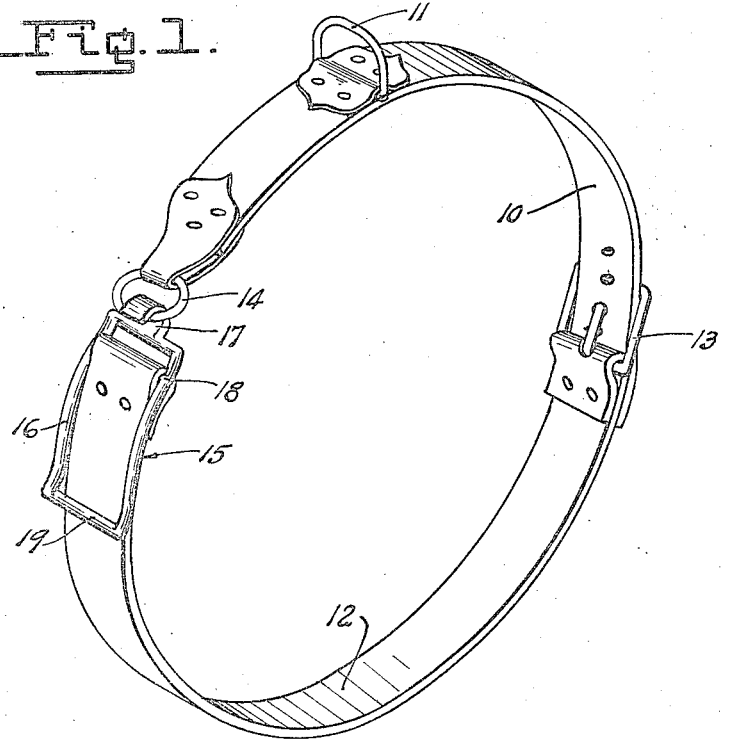

L. C. RIDENOUR.
SURCINGLE.
APPLICATION FILED JAN. 18, 1922.

1,436,777.   Patented Nov. 28, 1922.

Inventor
Lawrence C. Ridenour
By Watson E. Coleman
Attorney

Patented Nov. 28, 1922.

1,436,777

UNITED STATES PATENT OFFICE.

LAWRENCE C. RIDENOUR, OF HIGBEE, COLORADO.

SURCINGLE.

Application filed January 18, 1922. Serial No. 530,116.

*To all whom it may concern:*

Be it known that I, LAWRENCE C. RIDENOUR, a citizen of the United States, residing at Higbee, in the county of Otero and State of Colorado, have invented certain new and useful Improvements in Surcingles, of which the following is a specification, reference being had to the accompanying drawings.

This invention relates to breaking and training devices, and more particularly to a surcingle band and a connection therefor whereby the band may be quickly released and removed from the animal.

Throughout certain portions of the country meetings are often held known as roundups or rodeos and in these meets it is customary for men to match their skill in riding wild horses and cattle without the use of a saddle, merely relying upon a surcingle. The ride completed, with the use of the ordinary surcingle it is necessary to rope the animal to remove the surcingle and often the animal will escape with the surcingle and endeavor to remove the same by rubbing against convenient structures destroying or impairing the value of the surcingle. As hereinbefore stated, an important object of the invention is to provide a fastener whereby the rider when leaving the animal may release the surcingle and carry the same with him, thereby preventing this destruction. Furthermore, the roping of the animal to remove the surcingle often results in injury and death of the animal.

These and other objects I attain by the construction shown in the accompanying drawings wherein for the purpose of illustration I have shown a preferred embodiment of my invention and wherein like reference characters designate like parts throughout:—

Figure 2:
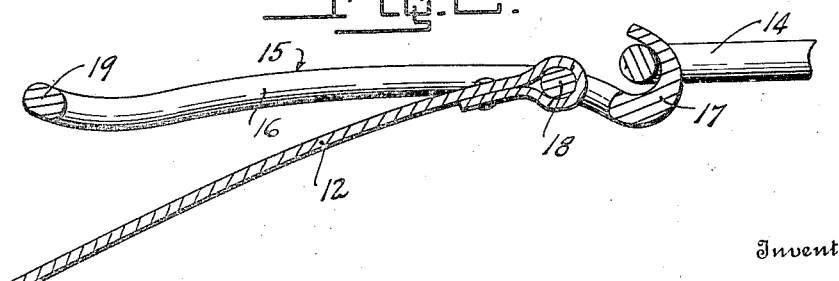

Figure 1 is a perspective view of a surcingle embodying a releasable connector constructed in accordance with my invention; and Figure 2 is a longitudinal sectional view taken through the connector.

Referring now more particularly to the drawings, I have shown a surcingle as comprised of a section 10, or upper section, adapted to extend across the back of the animal and provided with the usual hand grip 11 adapted to be engaged by the hand of the rider, and a section 12 adapted to extend beneath the belly of the animal and adjustably connected at one end to one end of the section 10, as indicated at 13. To the free end of the section 10 of the surcingle I apply a ring 14 and to the free end of the section 12 I apply a connecting member 15.

This connecting member comprises what is shown in the present instance as a rectangular frame 16 provided at one end with a hook 17 adapted to receive the ring 14, the hook being so constructed that it releases the ring 14 when the attaching member 15 is arranged at approximately right angles thereto. The rectangular frame 16 is provided adjacent the end thereof having the hook 17 with a cross bar 18 to which the belly band 12 of the surcingle is attached and the end opposite to that bearing the hook and designated by the character 19 is adapted to be engaged by the hand of the rider.

In the use of my device the surcingle is applied to the animal and tightened by the use of the adjustable connection 13. When the ride is completed, prior to leaving the animal the rider engages the end 19 of the connecting member 15 with his hand drawing the same upwardly and the ring 14 is thereby released, releasing the surcingle which may be removed from the animal either by retaining the grasp upon the end 19 or upon the hand grip 11 of the band 10.

From the foregoing it will be seen that by the use of a surcingle constructed in accordance with my invention the necessity of roping the animal and the danger of injury to the surcingle are avoided except in such instances where the rider may happen to be thrown. It will furthermore be obvious that many changes are possible in the construction hereinbefore set forth without in any manner departing from the spirit of my invention and I accordingly do not limit myself thereto except as hereinafter claimed.

What I claim is:

1. A surcingle for use in breaking and training horses and the like comprising a pair of adjustably connected sections one of which is provided upon the free end thereof with a connecting member, the other of which is provided with a device adapted to be engaged by the connecting member, said device being released from its engagement with the connecting member upon disposition of the connecting member at an approximate right angle thereto and a hand grip secured to one of said sections.

2. A surcingle for use in breaking and training horses and the like, comprising a back band and a belly band adjustably connected to one another at corresponding ends, the free end of the back band being provided with a ring, the free end of the belly band being provided with a pivoted connecting member embodying a hook adapted to engage the ring, said hook releasing said ring when the lower end of the connecting member is moved upwardly, and a hand grip secured to said back band.

3. A device for use in breaking and training horses or the like comprising a body encircling band adjustable as to length and provided at the free ends thereof with engageable sections, of a quick detachable connector whereby the band may be secured to the body of the animal, and a hand grip secured to said band upon what is the back engaging portion thereof when the band is applied to the body of the animal.

In testimony whereof I hereunto affix my signature.

LAWRENCE C. RIDENOUR.